(12) United States Patent
Stollberg et al.

(10) Patent No.: US 9,328,226 B2
(45) Date of Patent: May 3, 2016

(54) RUBBER MIXTURE

(71) Applicant: Continental Reifen Deutschland GmbH, Hannover (DE)

(72) Inventors: Sandra Stollberg, Auhagen (DE); Hubert Hirschlag, Laatzen (DE); Jorge Lacayo-Pineda, Neustadt (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 14/512,909

(22) Filed: Oct. 13, 2014

(65) Prior Publication Data

US 2015/0031820 A1 Jan. 29, 2015

Related U.S. Application Data

(63) Continuation of application No. PCT/EP2013/054822, filed on Mar. 11, 2013.

(30) Foreign Application Priority Data

Apr. 16, 2012 (DE) .......................... 10 2012 103 273

(51) Int. Cl.
*C09B 67/00* (2006.01)
*C08K 3/30* (2006.01)
*C08L 9/06* (2006.01)
*B60C 1/00* (2006.01)

(52) U.S. Cl.
CPC ................. *C08L 9/06* (2013.01); *B60C 1/0016* (2013.04); *B60C 1/0041* (2013.04)

(58) Field of Classification Search
CPC ....................................................... C08L 9/06
USPC ......................................................... 524/127
See application file for complete search history.

(56) References Cited

U.S. PATENT DOCUMENTS

| | | | | |
|---|---|---|---|---|
| 4,740,559 A | * | 4/1988 | Johansson et al. | 525/185 |
| 4,775,724 A | | 10/1988 | Morimoto et al. | |
| 2002/0077408 A1 | * | 6/2002 | Rauline | 524/495 |
| 2011/0190416 A1 | * | 8/2011 | Maesaka et al. | 523/155 |

FOREIGN PATENT DOCUMENTS

| | | |
|---|---|---|
| EP | 0 476 385 A1 | 3/1992 |
| FR | 2 603 273 A1 | 3/1988 |
| JP | 63-159453 A | 7/1988 |
| JP | 2012-21058 A | 2/2012 |
| JP | 2012-21091 A | 2/2012 |
| JP | 2012021058 A * | 2/2012 |

OTHER PUBLICATIONS

Translation of JP2012-021058, Feb. 2, 2012.*
Data Sheet of Catenex SNR, 2011.*
Product information of Sundex 790, 2009.*
International Search Report dated May 17, 2013 of international application PCT/EP2013/054822.

* cited by examiner

*Primary Examiner* — Hui Chin
(74) *Attorney, Agent, or Firm* — Walter Ottesen, P.A.

(57) ABSTRACT

A rubber mixture is disclosed which is suitable in particular for vehicle pneumatic tires, belts, drive belts and hoses. The rubber mixture includes the following: at least one polar or nonpolar rubber, at least one pale- and/or dark-colored filler, at least one sulfur, which is mixed with at least one terpenoid and/or at least one high-viscosity oil, and optionally other additional substances.

9 Claims, No Drawings

RUBBER MIXTURE

CROSS REFERENCE TO RELATED APPLICATIONS

This application is a continuation application of international patent application PCT/EP2013/054822, filed Mar. 11, 2013, designating the United States and claiming priority from German application 10 2012 103 273.4, filed Apr. 16, 2012, and the entire content of both applications is incorporated herein by reference.

FIELD OF THE INVENTION

The disclosure relates to a rubber mixture, in particular for pneumatic tires, drive belts, other belts and hoses.

BACKGROUND OF THE INVENTION

The rubber composition of the tread is a major determinant of the running properties of a tire, in particular of a pneumatic tire. The rubber mixtures used in drive belts and other belts, and in hoses, especially in the locations exposed to high mechanical loads, are likewise substantially responsible for the stability and durability of these rubber items. These rubber mixtures for pneumatic tires, drive belts and other belts, and hoses are therefore subject to very stringent requirements.

An important constituent of rubber mixtures is elemental sulfur, which during the vulcanization process is essential for the crosslinking of the polymers present in the rubber mixture. Inadequate and/or poor crosslinking is reflected in defective physical properties of the rubber mixture. If the sulfur is to be capable of ensuring good crosslinking, it must be well dispersed in the rubber mixture, that is, uniformly distributed.

The sulfur used in pneumatic tires and in technical rubber products is often an insoluble sulfur, to which oil is admixed in order to prevent dusting and thus to prevent explosions during production or processing. This oil generally involves plasticizer oils of the type commonly used in the rubber industry, for example naphthenic oils.

The oil used determines to a not inconsiderable extent the dispersibility of the sulfur.

SUMMARY OF THE INVENTION

It is therefore an object of the present disclosure to provide a rubber mixture, in particular for pneumatic tires, drive belts and other belts, which features improved dispersibility of the sulfur in rubber mixtures.

At the same time, the intention is thus to exert a favorable effect on the ultimate tensile strength and the durability of the rubber mixture.

The object is achieved via a rubber mixture with the following composition:
  at least one polar or nonpolar rubber;
  at least one pale- and/or dark-colored filler;
  at least one sulfur, mixed with at least one terpenoid and/or with at least one high-viscosity oil; and,
  optionally other additional substances.

Surprisingly, it has been found that the sulfur in a rubber mixture can be dispersed to better effect if it has been mixed with at least one terpenoid and/or with at least one high-viscosity oil.

This significantly reduces the extent of the sulfur agglomerates frequently observed hitherto in the rubber mixture. These sulfur agglomerates indicate poor dispersion and must, where appropriate, be eliminated in a further operation, if this is actually possible. These agglomerates in the rubber mixture represent foreign bodies which can act as fracture centers and thus impair ultimate tensile strength and durability.

DESCRIPTION OF THE PREFERRED EMBODIMENTS OF THE INVENTION

In a preferred embodiment, the rubber mixture comprises at least one sulfur, mixed with at least one terpenoid and/or with at least one high-viscosity oil. As a result, the sulfur in the rubber mixture is dispersed to a better effect, and the abovementioned improvements are obtained.

Terpenoids are also often termed isoprenoids, and are a structurally heterogeneous group, deriving from two unitary C5 compounds (isopentenyl diphosphate IPDP or its isomer dimethylallyl diphosphate DMAP). The structures of terpenoids can therefore be constructed by taking a plurality of isoprene units (2-methylbutadiene units), that is, C5 units. Terpenoids include terpenes and terpene derivatives which do not have hydrocarbon skeletons composed exclusively of isoprene units. Terpenoids can be cyclic, where appropriate having open chains, and by way of example take the form of monocyclic, bicyclic, tricyclic, et cetera, terpenoids. Terpenoids can be a racemic mixture of enantiomeric terpenoids or can, in pure form, take the form of optically active isomers of the terpenoids.

In one particularly preferred embodiment, the terpenoid is a terpene with a hydrocarbon skeleton composed exclusively of isoprene units, or is a terpene derivative which is not exclusively composed of isoprene units. Terpene derivatives usually have a terpene skeleton which has been structurally reorganized. This means that, by way of example, one or more carbon atoms are missing or are differently arranged, additional carbon atoms are present which do not originate from the isoprene units.

Terpenes can be selected from hemiterpenes, monoterpenes, sesquiterpenes, diterpenes, sesterpenes, and triterpenes. Terpene derivatives in essence include fully saturated or partially saturated isomers of terpenes, as well as alcohols, aldehydes, esters, et cetera, of terpenes.

There are various ways of obtaining terpenoids, by way of example directly from plants or plant constituents, or plant extracts, or via operations carried out on plants or plant extracts, or else via the synthetic production processes known to the person skilled in the art.

Particularly good results can be achieved when the terpenoid and/or the high-viscosity oil has from 20 to 45 carbon atoms. The boiling range of the terpenoids and/or of the high-viscosity oil is advantageously in the range from 350 to 550° C. The proportion of cyclic alkanes, in particular terpanes and/or triterpanes and/or steranes, is preferably from 0.02 to 10% by weight. The kinematic viscosity at 40° C. of the high-viscosity oil is preferably greater than 80 $mm^2/s$.

The phr unit used in this disclosure (parts per hundred parts of rubber by weight) is the conventional quantitative unit for mixture formulations in the rubber industry. The quantity added of the individual substances in parts by weight here is always based on 100 parts by weight of the entire composition of all of the rubbers present in the mixture.

The rubber mixture comprises at least one polar or non-polar rubber. The polar or non-polar rubber here is selected from the group consisting of natural polyisoprene and/or synthetic polyisoprene, and/or butadiene rubber, and/or styrene-butadiene rubber, and/or solution-polymerized styrene-butadiene rubber, and/or emulsion-polymerized styrene-butadiene rubber, and/or liquid rubbers, and/or halobutyl rubber, and/or polynorbornene, and/or isoprene-isobutylene copolymer, and/or ethylene-propylene-diene rubber, and/or nitrile rubber, and/or chloroprene rubber, and/or acrylate rubber, and/or fluoro rubber, and/or silicone rubber, and/or polysulfide rubber, and/or epichlorohydrin rubber, and/or styrene-isoprene-butadiene terpolymer, and/or hydrogenated acrylonitrile-butadiene rubber, and/or isoprene-butadiene copolymer, and/or hydrogenated styrene-butadiene rubber.

In particular nitrile rubber, hydrogenated acrylo-nitrile-butadiene rubber, chloroprene rubber, butyl rubber, halobutyl rubber, or ethylene-propylene-diene rubber are used in the production of technical rubber items such as drive belts and other belts, and hoses.

However, it is preferable that the rubber mixture comprises natural and/or synthetic polyisoprene, and specifically in quantities from 20 to 100 phr, preferably from 30 to 100 phr, particularly preferably from 40 to 100 phr.

In a particular embodiment, the polar or non-polar rubber involves a butadiene rubber. The quantities used of the butadiene rubber are preferably from 2 to 60 phr, preferably from 2 to 50 phr, particularly preferably from 5 to 50 phr, very particularly preferably from 10 to 50 phr, and more particularly preferably from 10 to 45 phr.

The polar or non-polar rubber can be a styrene-butadiene rubber, preferably solution-polymerized or emulsion-polymerized. The styrene-butadiene rubber can have been hydrogenated, and in one particularly advantageous embodiment has been solution-polymerized.

The styrene-butadiene rubber can moreover have been modified with hydroxy groups, and/or epoxy groups, and/or siloxane groups, and/or amino groups, and/or aminosiloxane, and/or carboxy groups, and/or phthalocyanine groups. However, it is also possible to use other modifications known to the person skilled in the art, another term used for these being functionalizations.

The quantities used of the styrene-butadiene rubber are from 2 to 98 phr, preferably from 2 to 90 phr, particularly preferably from 2 to 80 phr, more particularly preferably from 5 to 80 phr.

The rubber mixture of the invention moreover comprises at least one pale- and/or dark-colored filler. The total quantity of filler can therefore be composed only of pale-colored or dark-colored filler, or of a combination of pale- and dark-colored fillers.

It is preferable that the pale-colored filler is silica, preferably precipitated silica.

The rubber mixture of the invention comprises from 1 to 300 phr, preferably from 1 to 250 phr, particularly preferably from 1 to 200 phr, more particularly preferably from 1 to 150 phr, and very particularly preferably from 1 to 100 phr, of silica. Of this total quantity of silica, the quantity coupled to the polymer matrix via a coupling agent, preferably silane, can be from 0 to 100%, and/or the quantity not coupled to the polymer matrix can be from 0 to 100%. This means that the entire quantity of silica is coupled completely or only to some extent via the coupling agent to the polymer matrix, or that there is no coupling at all of the silica to the polymer matrix.

The silicas used in the tire industry are generally precipitated silicas, in particular characterized by their surface area. Characterization is achieved here by stating, in $m^2/g$, the nitrogen surface area (BET) in accordance with DIN 66131 and DIN 66132 as a measure of the internal and external surface area of the filler in $m^2/g$, and the CTAB surface area in accordance with ASTM D3765 as a measure of the external surface area, which is often regarded as the surface area effective in rubber.

The disclosure uses silicas with nitrogen surface area greater than or equal to 100 $m^2/g$, preferably from 120 to 300 $m^2/g$, particularly preferably from 140 to 250 $m^2/g$, and with CTAB surface area from 100 to 250 $m^2/g$, preferably from 120 to 230 $m^2/g$, and particularly preferably from 140 to 200 $m^2/g$.

If a coupling agent, in the form of silane or of an organosilicon compound, is used the quantity of the coupling agent is from 0 to 20 phr, preferably from 0.1 to 15 phr, particularly preferably from 0.5 to 10 phr. Coupling agents that can be used here are any of the coupling agents known to the person skilled in the art for use in rubber mixtures.

The dark-colored filler is preferably carbon black, and specifically preferably in quantities of from 0 to 100 phr, particularly preferably quantities of from 0 to 80 phr, but at least 0.1 phr, in particular at least 0.5 phr, of at least one carbon black. In one particularly preferred embodiment, the iodine number of the carbon black, in accordance with ASTM D1510, which is also called iodine absorption number, is greater than or equal to 75 g/kg, and its DBP number is greater than or equal to 80 $cm^3/100$ g. The DBP number in accordance with ASTM D2414 defines the specific absorption volume of a carbon black or of a pale-colored filler by using dibutyl phthalate.

The use of this type of carbon black in the rubber mixture, in particular for pneumatic tires, ensures an ideal compromise between abrasion resistance and heat generation, which in turn affects the environmentally relevant property of rolling resistance. It is preferable here to use only one type of carbon black in each rubber mixture, but it is also possible to mix various types of carbon black into the rubber mixture.

The rubber mixture can moreover also comprise at least one plasticizer. This plasticizer is selected from the group consisting of mineral oils and/or synthetic plasticizers and/or fatty acids and/or fatty acid derivatives and/or resins and/or factices and/or glycerides and/or terpenes and/or vegetable oils and/or BTL (biomass-to-liquid) oils and/or RTL (rubber-to-liquid) oils and/or liquid polymers with molar mass from 200 to 200 000 g/mol. Preferred quantities used of the plasticizer are from 0.1 to 100 phr, particularly from 0.1 to 80 phr, and very particularly from 0.1 to 50 phr.

When mineral oil is used it is preferable that this is selected from the group consisting of DAE (distilled aromatic extracts), and/or RAE (residual aromatic extract), and/or TDAE (treated distilled aromatic extracts), and/or MES (mild extracted solvents), and/or naphthenic oils.

The rubber mixture also comprises other additional substances.

Other additional substances in essence include the crosslinking system (crosslinking agent, sulfur donors, and/or elemental sulfur, accelerator, and retarder), antiozonants, antioxidants, mastication aids, and other activators. The quantitative proportion of the entire quantity of other additional substances is from 3 to 150 phr, preferably from 3 to 100 phr, and particularly preferably from 5 to 80 phr.

Within the entire quantitative proportion of the other additional substances there is also from 0.1 to 10 phr of zinc oxide, preferably from 0.2 to 8 phr, particularly preferably from 0.2 to 4 phr.

For sulfur crosslinking of a rubber mixture with vulcanization accelerators it is conventional to add zinc oxide as activator, mostly in combination with fatty acids (for example, stearic acid). The sulfur is then activated via complex-formation for the vulcanization process. The BET surface area of the zinc oxide conventionally used here is generally less than 10 m²/g. However, it is also possible to use what is known as nano-zinc oxide with BET surface area of from 10 to 60 m²/g.

The vulcanization of the rubber mixture is preferably carried out in the presence of elemental sulfur, for example the sulfur of the invention, or of sulfur donors, and some sulfur donors here can act simultaneously as vulcanization accelerators. The quantities of elemental sulfur or sulfur donors added to the rubber mixture in the final mixing step are those commonly used by the person skilled in the art (from 0.4 to 20 phr, preferred quantities of elemental sulfur being from 0 to 10 phr, particularly from 0.1 to 6 phr). Quantities of the sulfur of the invention that should be present in the rubber mixture are at least 0.1 phr, in particular 0.5 phr. In order to control the time required and/or the temperature for the vulcanization process, and in order to improve the properties of the vulcanizate, the rubber mixture can comprise substances that affect vulcanization, for example vulcanization accelerators, vulcanization retarders, which according to the invention are within the additional substances described above, and vulcanization activators, as described above.

The rubber mixture of the invention is produced by the process that is conventional in the rubber industry, in which a parent mixture is first produced in one or more mixing stages with all of the constituents except for the vulcanization system (sulfur and substances affecting vulcanization). The finished mixture is produced in a final mixing stage via addition of the vulcanization system. The finished mixture is further processed and converted to the appropriate form by way of an example through an extrusion procedure.

Another object of the disclosure is to use the rubber mixture as described above for the production of pneumatic tires, in particular for the production of the tread of a tire, and/or a body mixture of a tire, and for the production of drive belts and other belts, and hoses.

For the use in pneumatic tires, the mixture is preferably converted to the form of a tread and applied in the known manner during the production of the green tire. However, the tread can also be wound in the form of a narrow strip of rubber mixture onto a green tire. If the tread has two parts, as described in the introduction, the rubber mixture is preferably used as mixture for the base.

The production of the rubber mixture for the use as body mixture in tires takes place in the manner described above for the tread. The difference lies in the shaping after the extrusion procedure. The resultant forms of the rubber mixture of the invention for a body mixture or a plurality of different body mixtures then serve for the construction of a green tire. For the use of the rubber mixture of the invention in drive belts and other belts, in particular in conveyor belts, the extruded mixture is converted to the appropriate form and, during this process or subsequently, often provided with reinforcement systems, for example, synthetic fibers or steel cords. This mostly gives a multilayer structure composed of one or more layers of rubber mixture, of one or more layers of identical or different reinforcement systems, and of one or more other layers of the same, or a different, rubber mixture.

For the use of the rubber mixture of the invention in hoses, preference is often given to peroxidic crosslinking rather than what is known as sulfur crosslinking. The hoses are produced by analogy with the process described in Handbuch der Kautschuktechnologie [Handbook of rubber technology], Dr. Gupta Verlag, 2001, chapter 13.4.

It is understood that the foregoing description is that of the preferred embodiments of the invention and that various changes and modifications may be made thereto without departing from the spirit and scope of the invention as defined in the appended claims.

What is claimed is:

1. A rubber mixture, comprising:
   at least one polar or nonpolar rubber;
   at least one pale- and/or dark-colored filler;
   at least one sulfur, mixed with a terpenoid, a high-viscosity oil or a mixture thereof; and,
   optionally other additional substances,
   wherein the terpenoid, the high-viscosity oil or the mixture thereof contain a proportion of cyclic alkanes of from 0.02% to 10% by weight.

2. The rubber mixture as claimed in claim 1, wherein the terpenoid is a terpene derivative.

3. The rubber mixture as claimed in claim 1, wherein the terpenoid comprises from 20 to 45 carbon atoms.

4. The rubber mixture as claimed in claim 1, wherein the kinematic viscosity at 40° C. of the high-viscosity oil is greater than 80 mm²/s.

5. A process for the production of a rubber mixture comprising:
   mixing at least one sulfur with a terpenoid, a high-viscosity oil or a mixture thereof;
   providing at least one polar or nonpolar rubber;
   providing at least one pale- and/or dark-colored filler;
   optionally, providing other additional substances; and,
   preparing the rubber mixture by mixing the at least one sulfur mixed with the terpenoid, the high-viscosity oil or the mixture thereof with the at least one polar or nonpolar rubber, the at least one pale- and/or dark-colored filler, and, optionally, with the other additional substances;
   wherein the sulfur mixed with the terpenoid, the high-viscosity oil or the mixture thereof is provided in a single-stage or multistage mixing process.

6. A method of producing a tire comprising:
   preparing a rubber mixture by mixing at least one sulfur with a terpenoid, a high-viscosity oil or a mixture thereof;
   providing at least one polar or nonpolar rubber;
   providing at least one pale- and/or dark-colored filler;
   optionally, providing other additional substances; and,
   mixing the at least one sulfur mixed with the terpenoid, the high-viscosity oil or the mixture thereof with the at least one polar or nonpolar rubber, the at least one pale- and/or dark-colored filler, and, optionally, with the other additional substances.

7. The process as claimed in claim 5 for the production of a tread and/or body mixture of a tire.

8. The process as claimed in claim 5, wherein the terpenoid, the high-viscosity oil or the mixture thereof contain a proportion of cyclic alkanes of from 0.02% to 10% by weight.

9. The method as claimed in claim 6, wherein the terpenoid, the high-viscosity oil or the mixture thereof contain a proportion of cyclic alkanes of from 0.02% to 10% by weight.

* * * * *